(12) United States Patent
Medasani et al.

(10) Patent No.: US 8,213,709 B1
(45) Date of Patent: Jul. 3, 2012

(54) METHOD AND SYSTEM FOR DIRECTED AREA SEARCH USING COGNITIVE SWARM VISION AND COGNITIVE BAYESIAN REASONING

(75) Inventors: Swarup Medasani, Thousand Oaks, CA (US); Yuri Owechko, Newbury Park, CA (US); Tsai-Ching Lu, Simi Valley, CA (US); Deepak Khosla, Camarillo, CA (US); David L. Allen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 337 days.

(21) Appl. No.: 12/590,110

(22) Filed: Nov. 3, 2009

(51) Int. Cl.
*G06K 9/62* (2006.01)

(52) U.S. Cl. .................................................... 382/155

(58) Field of Classification Search .................. 382/100, 382/155–161, 181–231
See application file for complete search history.

(56) References Cited

U.S. PATENT DOCUMENTS

| | | | | |
|---|---|---|---|---|
| 6,553,356 | B1 * | 4/2003 | Good et al. | 706/15 |
| 7,003,158 | B1 * | 2/2006 | Bennett et al. | 382/187 |
| 7,558,762 | B2 | 7/2009 | Owechko et al. | |
| 7,672,911 | B2 | 3/2010 | Owechko et al. | |
| 2006/0088207 | A1 * | 4/2006 | Schneiderman | 382/159 |

OTHER PUBLICATIONS

D. Nister and H. Stewenius, "Scalable recognition with a vocabulary tree," in Proc. CVPR , vol. 5, 2006.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Video-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

(Continued)

*Primary Examiner* — Alex Liew
(74) *Attorney, Agent, or Firm* — Cary Tope-McKay

(57) ABSTRACT

A method and system for a directed area search using cognitive swarm vision and cognitive Bayesian reasoning is disclosed. The system comprises a domain knowledge database, a top-down reasoning module, and a bottom-up module. The domain knowledge database is configured to store Bayesian network models comprising visual features and observables associated with various sets of entities. The top-down module is configured to receive a search goal, generate a plan of action using Bayesian network models, and partition the plan into a set of tasks/observables to be located in the imagery. The bottom-up module is configured to select relevant feature/attention models for the observables, and search the visual imagery using a cognitive swarm for the at least one observable. The system further provides for operator feedback and updating of the domain knowledge database to perform better future searches.

33 Claims, 10 Drawing Sheets

OTHER PUBLICATIONS

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for modeling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. of Intl. Conference on Image Processing, vol. 2, Oct, pp. 23-26, 1995.

V. Ciesielski and M. Zhang. "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, pp. 19-24. Beijing, China, Apr. 26-31, 1999.

Kennedy, J., Eberhart, R. C., and Shi, Y., Swarm Intelligence San Francisco: Morgan Kaufmann Publishers, 2001, Chapter 7 ("The Particle Swarm"), pp. 287-318.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE, Publication Date: Jun. 17-21, 2002, vol. 1, on pp: 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: a Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. on Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.J. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336.

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural NetWorks, Technical Report, R-277, Nov. 2000.

Avrim Blum (1996), "On-Line Algorithms in Machine Learning", in Proceedings of the Workshop on On-Line Algorithms.

Notice of Allowability for U.S Appl. No. 11/433,159.

Reply to Notice of Allowance for U.S Appl. No. 11/433,159.

Notice of Allowability for U.S Appl. No. 10/918,336.

Notice of Allowability for U.S Appl. No. 11/800,265.

Notice of Allowability for U.S Appl. No. 11/367,755.

Notice of Allowability for U.S Appl. No. 11/385,983.

\* cited by examiner

| Ranked Targets | Probability |
|---|---|
| Desert: Yes | .900 |
| Airport: Yes | .500 |
| Airport in Desert: Yes | .450 |

FIG. 8B

| Ranked Observables | Diagnostic Value |
|---|---|
| Stony Surfaces | .348 |
| Vegetation | .223 |
| Rocky Terrain | .147 |
| Control Tower | <0.001 |
| Landing Strips | <0.001 |
| Aircraft Maintenance | 0 |
| Cargo Buildings | 0 |
| Refilling Facilities | 0 |
| Terminal Buildings | 0 |

FIG. 8A

METHOD AND SYSTEM FOR DIRECTED AREA SEARCH USING COGNITIVE SWARM VISION AND COGNITIVE BAYESIAN REASONING

BACKGROUND OF THE INVENTION (1) Field of Invention

The present invention relates to searching for objects in visual imagery and, more specifically, to a method and system for a directed area search using cognitive swarm vision and cognitive Bayesian reasoning.

(2) Description of Related Art

Current systems that aim to automatically search for targets such as factories, airports, etc., in wide area overhead imagery face several major problems. These problems include finding targets hidden in terabytes of information, relatively few pixels on target, and long intervals between interesting regions. Furthermore, time-consuming analysis by humans requires many analysts. Also, in real life situations, no a priori representative examples or templates of interest may be available to aid the system in its search. Current systems also lack the ability to detect multiple classes of objects, and fail to provide the combination of very high detection rates (at least 95% detection rates) and very low false alarm rates (for example significantly less than 10 false alarms per square mile).

Preliminary attempts to solve the aforementioned problems have concentrated on the simple aspects of combining domain knowledge with visual recognition. Liao (see literature reference no. 6 in the "List of Cited References" below). Such systems used domain knowledge and abstracted canonical models elicited from typical visual scenes for comparison. These systems are also highly tuned to specific object types and do not specify how context can be used to recognize multiple entities in the scene.

With regard to a top-down engine for guiding the search process, Liao (see literature reference no. 6) proposes an influence diagram as an active fusion model for representing, integrating, and inference of uncertain sensory information of different modalities at multiple levels of abstraction. However, the proposed influence diagram lacks flexibility and the ability to learn over time via operator feedback.

With regard to visual recognition, there have been several attempts at recognizing buildings, vehicles, etc, from aerial imagery that use high-level descriptions of the entities being searched. Jaynes (see literature reference No. 7) and Huertas (see literature reference No. 8). While operable for detection of a single class, these systems cannot effectively process multiple classes of objects under continuously changing knowledge context conditions.

Thus, a continuing need exists for a comprehensive system for directed area search which can process operator feedback to improve its domain knowledge over time and effectively process multiple classes of objects under continuously changing knowledge context conditions.

SUMMARY OF INVENTION

The present invention relates to searching for objects in visual imagery and, more specifically, to a method and system for a directed area search using cognitive swarm vision and cognitive Bayesian reasoning. In a first aspect, the present invention is a system for directed area search in visual imagery, comprising a domain knowledge database, a top-down module, and a bottom-up module. The domain knowledge database is configured to store Bayesian models comprising visual features and observables associated with various sets of entities, where the observables are associated with feature/attention models for locating the observables in visual imagery. The top-down module is configured to receive a search goal comprising a set of entities to be located in an image. The top-down module then generates a plan of action for locating the set of entities by combining the Bayesian network models relating to the set of entities to be located, the plan describing visual features associated with the set of entities, where the Bayesian network models and associated visual features are obtained from the domain knowledge database. The plan is then partitioned into a set of tasks, each task comprising at least one observable to be located in the visual imagery. The bottom-up module is configured to select a relevant classifier and feature/attention model for each observable from the domain knowledge database. The bottom-up module then searches the visual imagery using a cognitive swarm for the at least one observable using the selected feature/attention model, and outputs search results as set of candidate entities.

In another aspect, the system further comprises a user interface configured to present the set of candidate entities to a selected classifier for validation of the set of entities and provide a validation score.

In yet another aspect of the system, the top-down module is further configured to receive feedback from the operator via the user interface regarding the search results and to update the domain knowledge database based on the feedback from the operator.

In another aspect, the system is further configured to generate a new plan of action using the updated domain knowledge database, and to iteratively repeat the search until the search goal is accomplished.

In yet another aspect, the bottom-up module is further configured to send a report of the search results to the top-down module. Also, the top-down module is further configured to assign a validation score to the search results based on performance accuracy of the bottom-up module in executing the set of tasks The validation score is then used to refine the classifiers and feature/attention models used for that particular task.

In a further aspect, the system is configured to iteratively repeat the search using the refined classifier and feature/attention model until the search goal is accomplished.

In yet another aspect, in a case where the domain knowledge database contains no feature/attention models relating to the search goal, the search is performed using unbiased center surround type saliency algorithms.

In another aspect, the present invention comprises method for directed area search in visual imagery. The method begins with an act of acquiring a domain knowledge database configured to store Bayesian models comprising visual features and observables associated with various sets of entities, where the observables are associated with classifier and feature/attention models for locating the observables in visual imagery. Then, a search goal comprising a set of entities to be located in an image is received. A plan of action is generated for locating the set of entities by combining the Bayesian network models relating to the set of entities to be located, the plan describing visual features associated with the set of entities, where the Bayesian network models and associated visual features are obtained from the domain knowledge database. The plan is then partitioned into a set of tasks, each task comprising at least one observable to be located in the visual imagery. A relevant classifier and feature/attention model for each observable is selected from the domain knowledge database. Next, the visual imagery is searched using a cognitive swarm for at least one observable using the selected feature/attention model. Finally, search results are output as set of candidate entities.

In another aspect, the method further comprises an act of presenting the set of candidate entities to the selected classifier for validation of the set of entities and provide a validation score.

In yet another aspect, the method further comprises an act of receiving feedback from the operator regarding the search results and updating the domain knowledge database based on the feedback from the operator.

In another aspect, the method further comprises an act of generating a new plan of action using the updated domain knowledge database, and iteratively repeating the search until the search goal is accomplished.

In yet another aspect, the method further comprises an act of a user assigning a validation score to the search results based on accuracy of the results of the executed set of tasks, and then using the validation score to refine the classifier and feature/attention models used for that particular set of tasks.

In another aspect, the method further comprises an act of iteratively repeating the search using the refined feature/attention model until the search goal is accomplished.

In yet another aspect of the method of the present invention, in a case where the domain knowledge database contains no feature/attention models relating to the search goal, the act of searching is performed using unbiased center surround type saliency algorithms.

Finally, as can be appreciated by one skilled in the art, the present invention also comprises a computer program product for directed area search in visual imagery, the computer program product comprising computer-readable instructions stored on a computer-readable medium that are executable by a computer having a processor for causing the processor to perform operations corresponding to the acts of the method of the present invention, as previously described.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8A is a chart showing a set of ranked observables and corresponding diagnostic values as output by the top-down task execution engine of the present invention;

FIG. 8B is a chart showing the probability of detection of search targets prescribed in the search goal of locating an airport in a desert;

DETAILED DESCRIPTION

Figure 1:
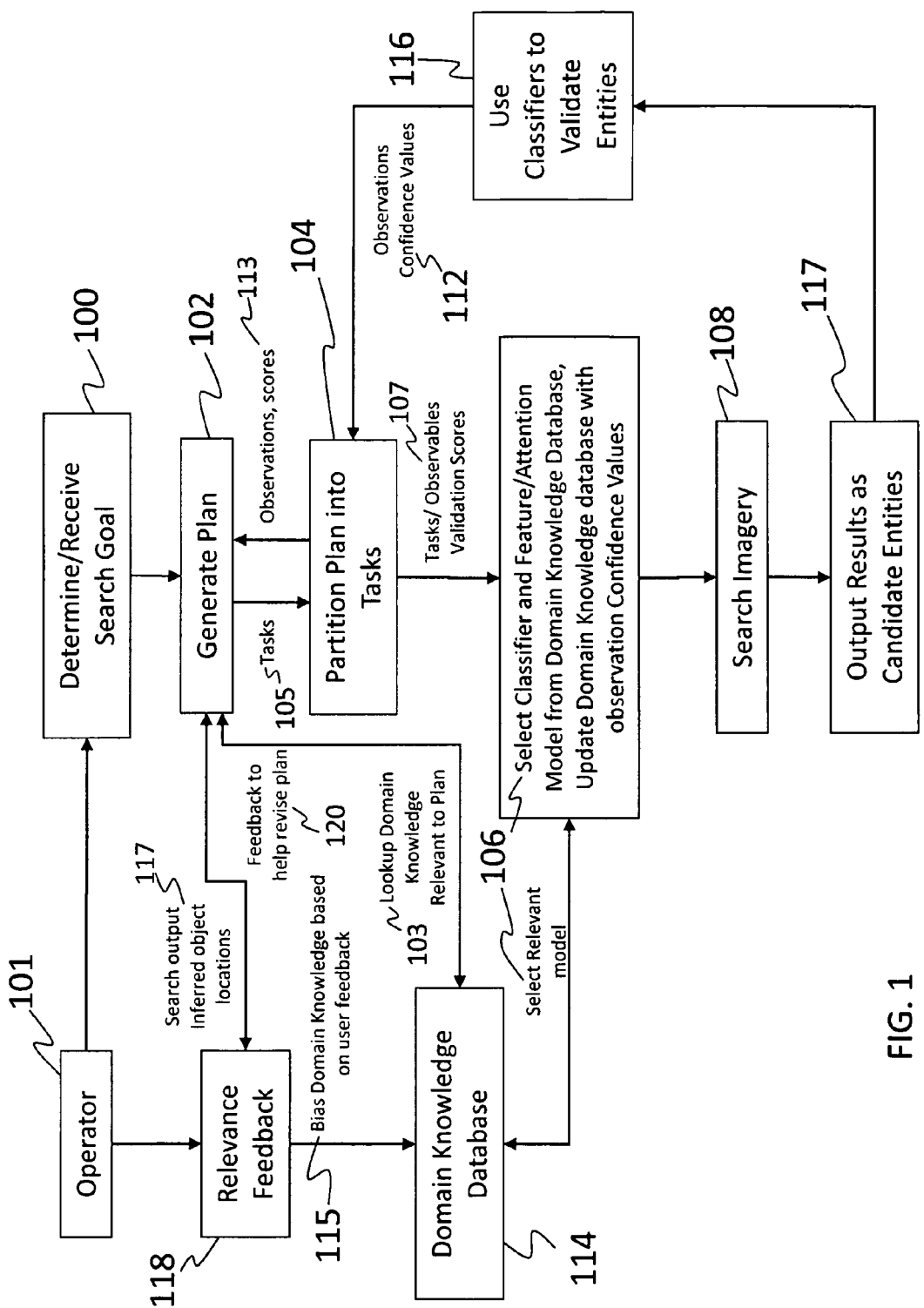
FIG. 1 is a flow diagram illustrating the overall method of the present invention.

The present invention relates to searching for objects in visual imagery and, more specifically, to a method and system for a directed area search using cognitive swarm vision and cognitive Bayesian reasoning. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. F. Orabona, G. Metta, and G. Sandini. Object-based Visual Attention: A Model for a Behaving Robot. In $3^{rd}$ *International Workshop on Attention and Performance in Computational Vision* (in CVPR 2005), San Diego, Calif., June 2005.

2. B. J. Scholl. Objects and Attention: The State of the Art. *Cognition* 80: 1-46, 2001.
3. Y. Sun and R. Fisher. Hierarchical Selectivity for Object-based Visual Attention. Submitted to *Artificial Intelligence*. 2004.
4. Y. Owechko, S. Medasani, and N. Srinivasa, "Classifier Swarms for Human Detection in Infrared Imagery", Proc. of the IEEE CVPR workshop on Object Tracking and Classification Beyond the Visible Spectrum (OTCBVS'04) 2004.
5. Y. Owechko, and S. Medasani, "A Swarm-Based Volition/Attention Framework for Object Recognition", Proc. of CVPR-WAPCV 2005.
6. Liao, Wenhul and Ji, Qiang 2006. Efficient Active Fusion for Decision-making via VOI Approximation, In Proc AAAI 2006, 1180-1185.
7. Jaynes, C., Stolle, F. and Collins, R., "Task Driven Perceptual Organization for Extraction of Rooftop Polygons," Proceedings of the ARPA Image Understanding Workshop, Monterey, Calif. (Morgan Kaufmann Publishers, San Francisco, 1994), pp. 359-365.
8. A. Huertas, and R. Nevatia, "Detecting Changes in Aerial Views of Man-Made Structures," IVC200.

(2) Method for Directed Area Search

The present invention relates to searching for objects in visual imagery and, more specifically, to a method and system for a directed area search using cognitive swarm vision and cognitive Bayesian reasoning. FIG. 1 is a flow diagram showing the acts of the method of the present invention. An operator 101 initiates the interaction with the system by determining 100 a search goal. The search goal is comprised of a set of entities to be located in visual imagery. An example of a search goal would be finding an airport near a desert area. The search goal can be delivered to the system via verbal description, a graphical sketch or line drawing, or a set of example imagery that contain instances of entities that need to be located. The system then generates a plan 102 by looking up 103 stored knowledge from a domain knowledge database 114 regarding the search goal for locating the set of entities. With regard to a search goal of finding an airport in a desert, the plan would describe what features constitute an airport and a desert. The generated plan 102 is then partitioned 104 into pertinent tasks 105. The set of tasks defines one or more observables 107 to be located in the visual imagery. For the example of finding an airport in a desert, tasks may include locating long runways for the airport and locating sand dunes for desert regions. To accomplish each task, a relevant classifier and feature/attention model is selected 106 for each observable being searched. The feature/attention model is then used to search 108 the imagery for the observables 107. The feature/attention models generally contain learned biases for features that correspond to the tasks/observables 107. For example, the feature/attention model for finding an airport may contain instructions to search for long parallel lines that may indicate a runway or control tower. In a case where domain knowledge regarding the prescribed tasks does not exist, then the search can be conducted using unbiased, center-surround type salient algorithms. Search results are output 110 as a set of candidate entities.

Once initial candidate entities are output 110, the candidate entities are validated 116 by a cognitive reasoning engine using the previously selected classifiers. Given the set of validated entities, a computer-generated confidence value 112 corresponding to the success of the task are fed back to the task execution engine, which generates task success scores 113 and then gives the scores to the plan generation module 102. The plan generation module 102 can also then search the output for inferred object locations 117 and present these locations to the operator 101 for operator controlled relevance feedback 118. The system uses the validation information from the operator and confidence values from the cognitive reasoning engine to bias 115 the knowledge base 114 and, optionally, to provide feedback 120 to the plan generation module in order to generate a new plan of action 102. The process can be iterated in this manner until the system converges on the set of entities specified in the search goal.

(3) System for Directed Area Search

Figure 2:
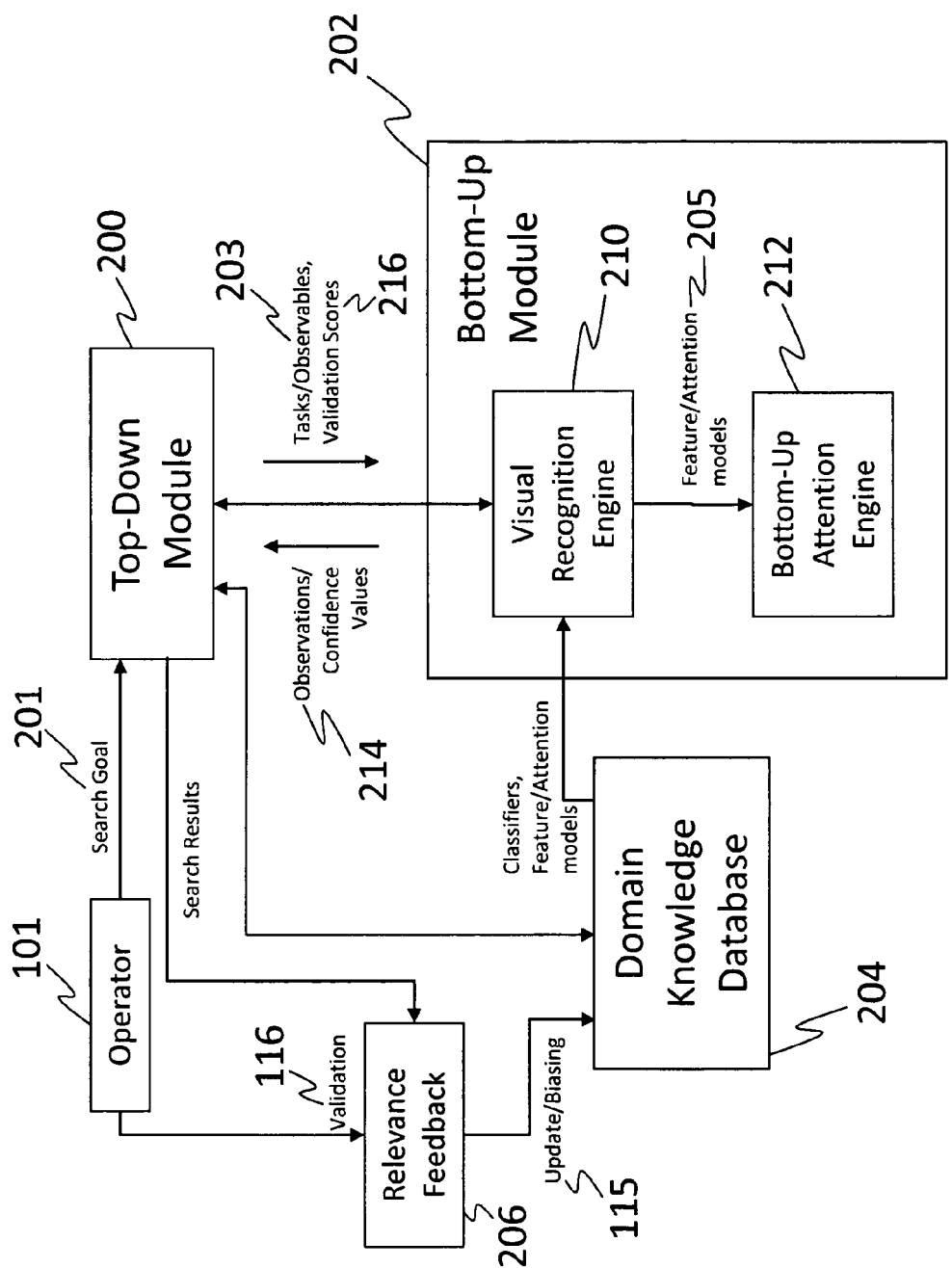
FIG. 2 is a block diagram showing the components of the system of the present invention, with an expanded view of the Bottom-up Module.

The main components of the system of the present invention are shown in FIG. 2, with an expanded view of the bottom-up module 202. The system comprises a top-down module 200, a bottom-up module 202, and a domain knowledge database 204. The top-down module 200 is a cognitive module configured to receive a search goal 201 from an operator 101, generate a plan of action, and partition the plan into a set of tasks/observables. The set of tasks/observables 203 is sent to the bottom-up module 202. The bottom-up module further comprises a visual recognition engine 210 and a bottom-up attention engine 212. The visual recognition engine 210 receives the set of tasks/observables 203 from the top-down module 200 and selects the appropriate classifiers and/or feature/attention models 205 for the observables from the domain knowledge database 204. In addition, suitable feature/attention models 205 relevant to the observables are selected from the domain knowledge database 204 are sent to the bottom-up attention engine 212, which uses the features to sub-select areas in the image where the visual recognition engine 210 looks for the observables. Results are output as a set of candidate entities 117. The candidate entities 117 can then be presented to the operator 101 for validation 116. Based on the operator's relevance feedback, the validated candidate entities are used to bias 115 the domain knowledge database 204. The bottom up module 202 also generates a search report comprising a set of confidence values 214 for the candidate entities based on how closely they matched the feature/attention models. The confidence values 214 are fed back to the top-down module 200, which assigns a validation score 216 to the search results based on performance accuracy of the bottom-up module in executing the set of tasks, and the validation score 216 is then used to refine the feature/attention model used for that particular task.

(3.1) Bottom-Up Module 202 (FIG. 2)

FIG. 2 depicts an expanded view of the internal components of the bottom-up module 202, which are described in detail below.

(3.1.1) Bottom-Up Attention Engine 212 (FIG. 2)

The bottom up module 202 searches imagery using a bottom-up attention engine 212, as shown in FIG. 2. The bottom-up engine attention engine 212 mimics the computation model of human visual attention and derives its inspiration from the biologically inspired, object-based visual saliency models of attention proposed by Orabona (see literature reference No. 1) and Sun (see literature reference No. 3). The concept of object-based saliency and attention in biological visual systems is supported by a number of experiments, such as the "selective looking" experiment. Scholl (see literature reference No. 2). The bottom-up attention method used in the present invention is invariant under both rotation and translation of the scene, and eschews the spotlight model of saliency in favor of a more pragmatic, object-based approach, which attends to each object in an image only once. The present method uses the feature information to automatically segment a scene into proto-objects, which are individually analyzed for saliency. The present invention employs several key features that improve it over previous work. For example, Orabona (see literature reference No. 1) primarily uses color features to segment objects and compute saliency. In contrast, the present invention explicitly adds intensity information in the feature set and handles it separately from color. The present invention also computes five features from fully-saturated color channels as opposed to just three as proposed in Orabona (see literature reference No. 1). Similarly, the approach of Sun (see literature reference No. 3) first manually segments objects and then computes the saliency of hand-segmented objects within an image and successfully transitions attention between them. However, the inability to automatically segment the scene dramatically reduces the utility of their method. The present invention performs a figure-ground separation of the scene, allowing for the easy extraction of salient proto-objects for further object recognition. Once the scene has been segmented into a grouping of proto-objects, the saliency of each is computed and ranked relative to the other proto-objects in the image. For each, the local neighborhood is highlighted in the image. A non-limiting example of a way to highlight the local neighborhood would be to create a rectangular bounding box surrounding the object whose area is several times larger than the object. The proto-object regions are sorted from most to least salient, and the segmentation data is forwarded to an object recognition module. Because each object can only be attended to once, the result is better than if an inhibition of return had been implemented on the most salient object.

The above attention algorithm used by the bottom-up attention engine 212 can be performed in either a top-down or a bottom-up mode. In a top-down mode, specific feature cues are used so that objects containing that feature draw more attention. In a bottom-up mode, no such cues are used. Executing the system in a top-down mode can allow it to process scenes faster, if such cues are available. For example, if one wishes to tune the system to detect red cars in a given scene, it will use this information to make red objects more salient than if bottom-up mode were run.

Figure 3:
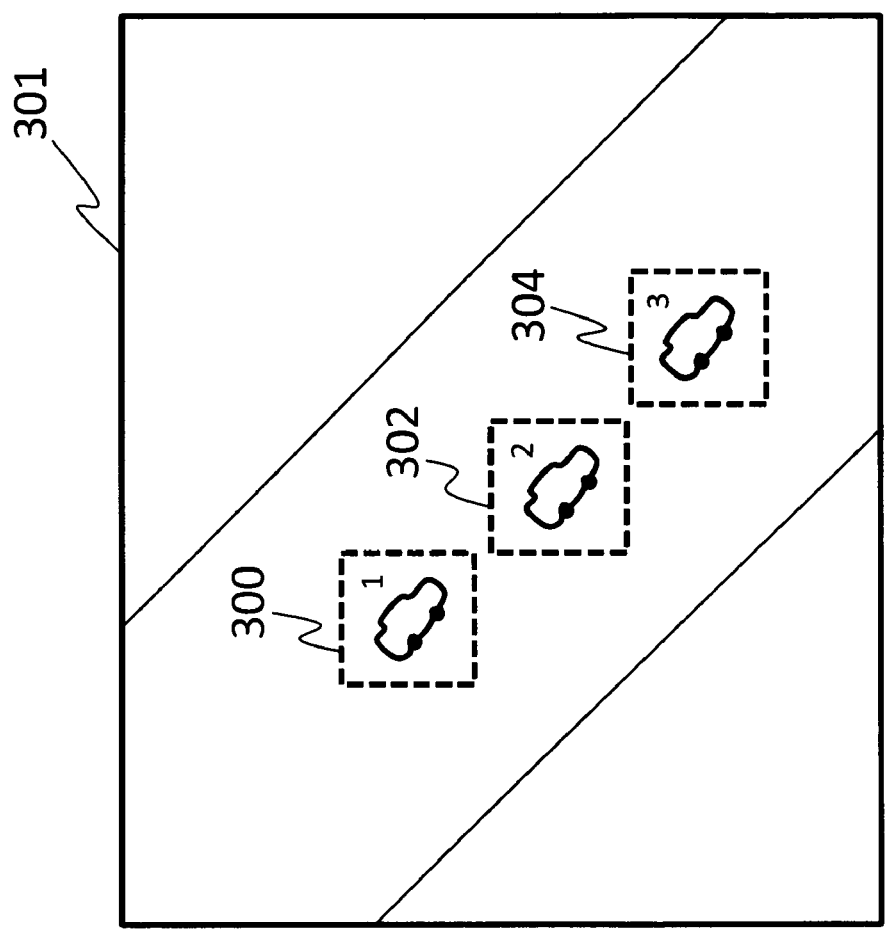
FIG. 3 is an illustration showing an image window with three detected objects as detected with an unbiased center-surround type saliency algorithm.

FIG. 3 is an illustration showing the performance of the above attention-algorithm as used in a bottom up mode, where the algorithm uses only bottom-up attention-based salient region detection and segmentation. The image frame 301 contains three vehicles 300, 302, and 304, which have been identified by the bottom-up attention engine as the top three salient regions (1, 2, and 3, respectively). In this example, no prior or top-down information was provided to the attention engine.

(3.1.2) Visual Recognition Engine

The visual recognition engine 210 of the present invention can implement any of a variety of object recognition classifier systems know in the art. A preferred aspect uses Swarm Vision technology, which is a high accuracy classifier system designed for video content analysis. Swarm-vision technology combines feature-based object classification with socio-biologically motivated search mechanisms based on cognitive swarm intelligence. Swarm vision technology is described in Owechko 2004 (see literature reference No. 4) and Owechko 2005 (see literature reference No. 5), as well as U.S. patent application Ser. No. 10/918,336, filed Aug. 14, 2004, titled "OBJECT RECOGNITION SYSTEM INCORPORATING SWARMING DOMAIN CLASSIFIERS," which is incorporated herein by reference as though reproduced in its entirety.

Swarm Vision technology is a search mechanism that can efficiently find multiple instances of multiple object classes in a scene without the need for ancillary sensors or brute force searching. The approach utilizes the particle swarm optimization (PSO) algorithm, a population based evolutionary algorithm, which is effective for optimization of a wide range of functions. The algorithm models the exploration of multi-dimensional solution space by a population of individuals where the success of each individual has an influence on the dynamics of other members of the swarm. Traditional PSO has proved effective in exploring complicated fitness landscapes and converging populations of particles to a single global optimum, although it has been shown that the traditional PSO is not guaranteed to converge to a local or global optimum. Inspired by the merits of the PSO algorithm, Owechko 2004 (see literature reference No. 4) and Owechko 2005 (see literature reference No. 5) present the use of sequential niching methods to locate multiple objects in the scene as well as requiring that each agent in the swarm is a classifier in itself. As the population searches the solution space, the classifiers adjust parameters to best detect the objects in the scene. In Owechko 2004 (see literature reference No. 4) and Owechko 2005 (see literature reference No. 5) swarming is done at the classifier level in a space consisting of object location, scale, and classifier parameter dimensions and where each particle is a complete classifier. The particles swarm in this space in order to find the local optima that correspond to objects in the image. The classifier details are not visible at the abstraction level of the swarm. The cognitive swarm approach in Owechko 2004 (see literature reference No. 4) and Owechko 2005 (see literature reference No. 5) uses particle swarm optimization (PSO) which has been shown to perform well on many important high-dimensional optimization problems.

PSO is a relatively simple optimization method that is inspired by biological models of insect swarms and bird flocks. Conceptually, it includes aspects of genetic algorithms and evolutionary programming. Each potential solution is assigned a randomized velocity vector and the potential solutions called particles then "fly" through a solution space in search of the function optima. Each particle keeps track of its coordinates in multi-dimensional space that are associated with the best solution (pbest) it has observed so far. A global best parameter (gbest) is used to store the best location among all particles. The velocity of each particle i is then changed towards pbest and gbest in a probabilistic way. The above dynamics reflect a socio-psychological model where individual particles change their beliefs in accordance with a combination of their own experience and the best experience of the group (in contrast to other models of cognition where an individual changes his beliefs to become more consistent only with his own experience). Searching using cognitive swarms has resulted in speedup factors of over one-thousand relative to sequential scanning when searching in three dimensions. The number of false alarms per image is also greatly reduced, which is very important for practical applications. The speedup and false alarm advantages over sequential scanning increase as the number of dimensions is increased which makes it feasible to include object rotation angle as one of the search space dimensions. This approach will help increase the range of applications for vision systems by improving performance, reducing computational requirements dramatically, eliminating the need for cueing sensors such as radar, and reducing overall cost of practical systems.

The basic architecture for the Swarm Vision classifier cascade is described in U.S. patent application Ser. No. 10/918, 336. The objective is to find multiple instances of an object class in an input image. The PSO particles fly in a solution space where two of the dimensions represent the x and y coordinates in the input image. The key concept in this approach is that each particle in the classifier swarm is a self-contained object classifier which outputs a value representing the classification confidence that the image distribution in the analysis window associated with that particle is or is not a member of the object class. All particles are instances of the same classifier and only the classifier parameters vary as the particle visits different positions in the solution space.

(3.2) Top-Down Module

Figure 4:
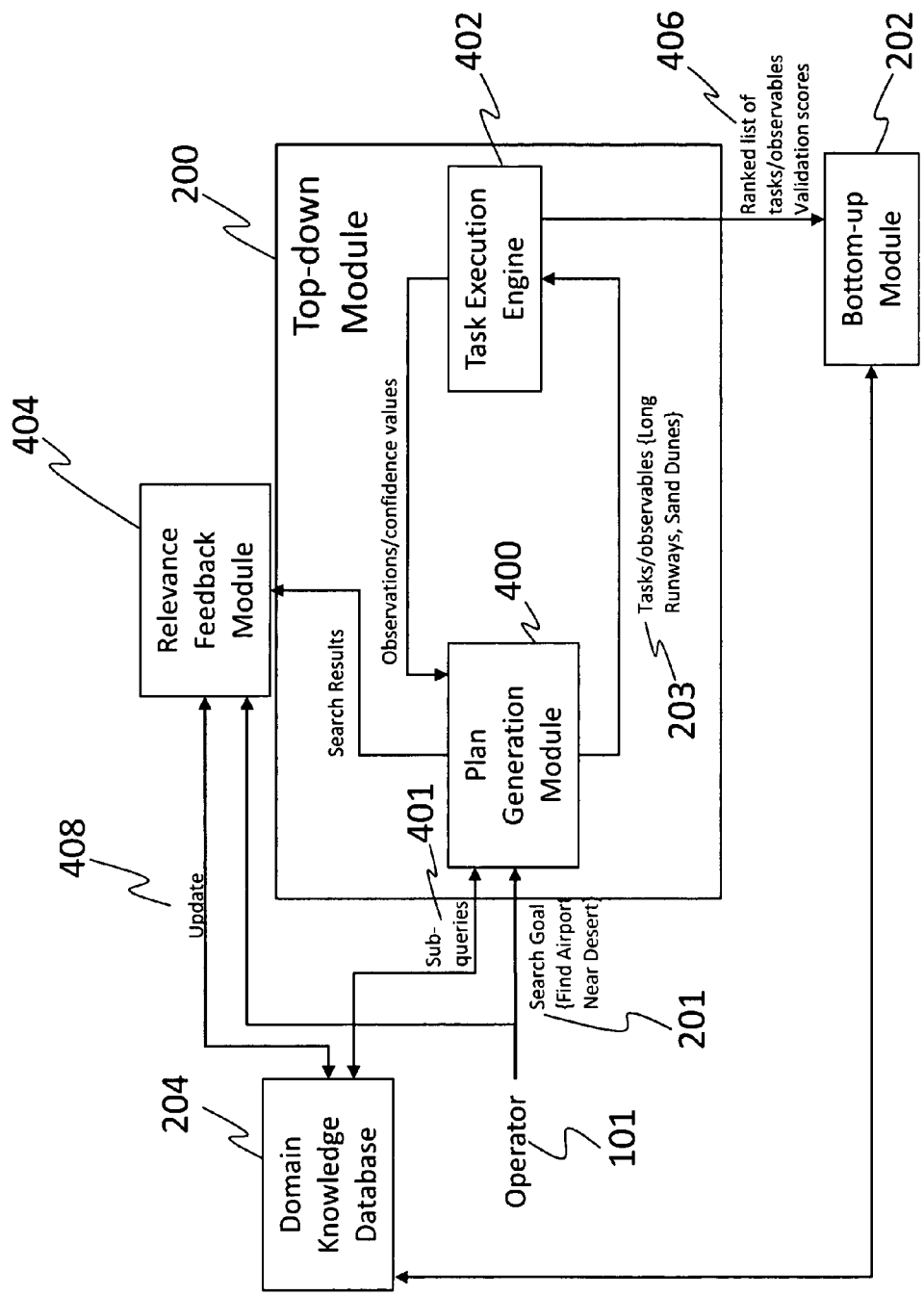
FIG. 4 is a block diagram showing the components of the system of the present invention, with an expanded view of the Top-Down Module.

Bayesian networks integrate graphical models and probability theory to efficiently represent and reason about joint probability distributions. They are commonly used in decision making, reasoning under uncertainty, and domain/data modeling. FIG. 4 depicts the components of the system of the present invention, with an expanded view of the top-down module 200. The top-down module 200 functions as a Bayesian reasoning engine in the form of a domain knowledge database 204, plan generation module 400, top-down task execution engine 402, and relevance feedback module 404. The following sections describe the functionalities modules and their interactions with other modules in the system of the present invention.

(3.2.1) Domain Knowledge Database

Figure 5:
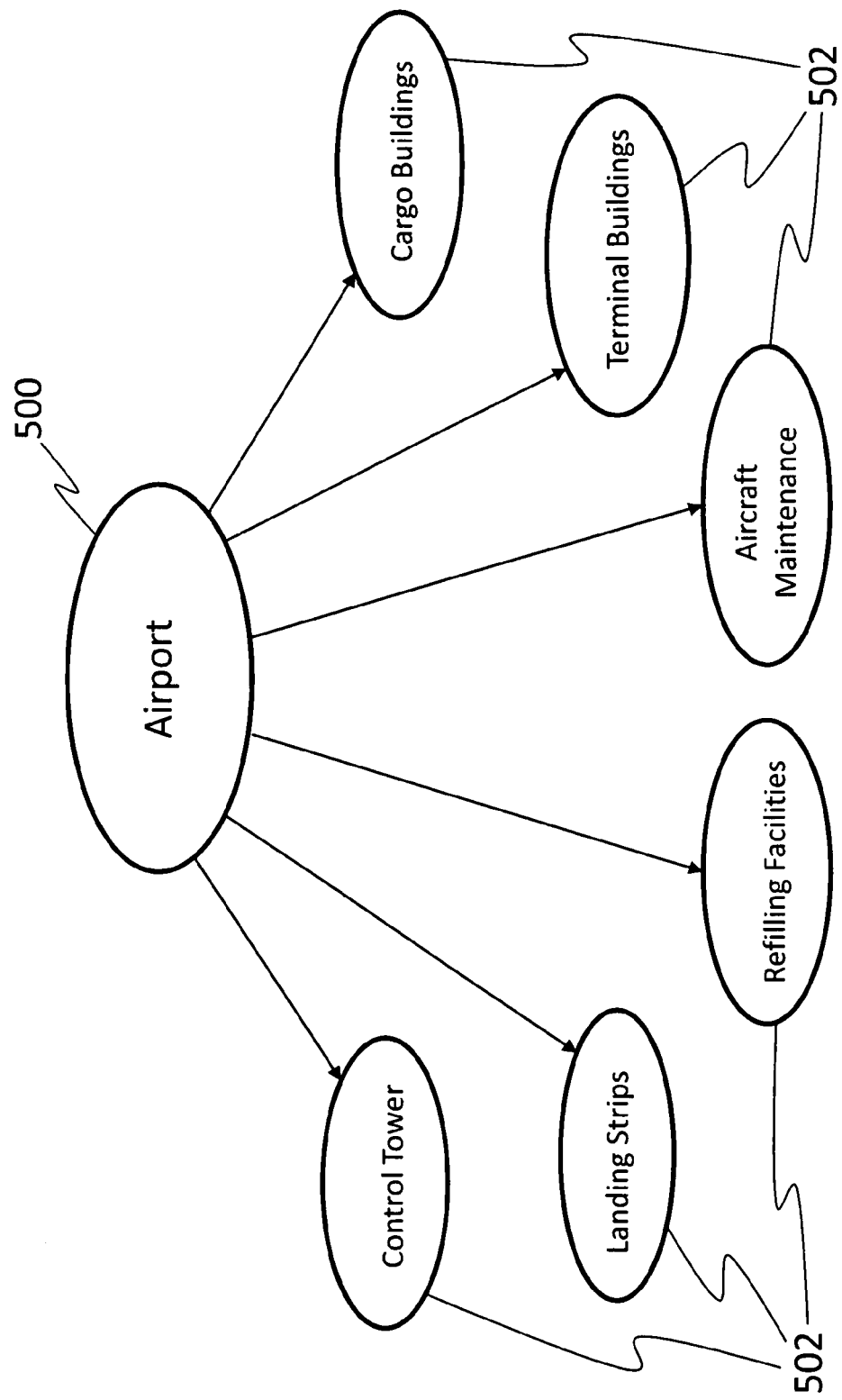
FIG. 5 is a diagram showing a Bayesian network model for an airport.
Figure 6:
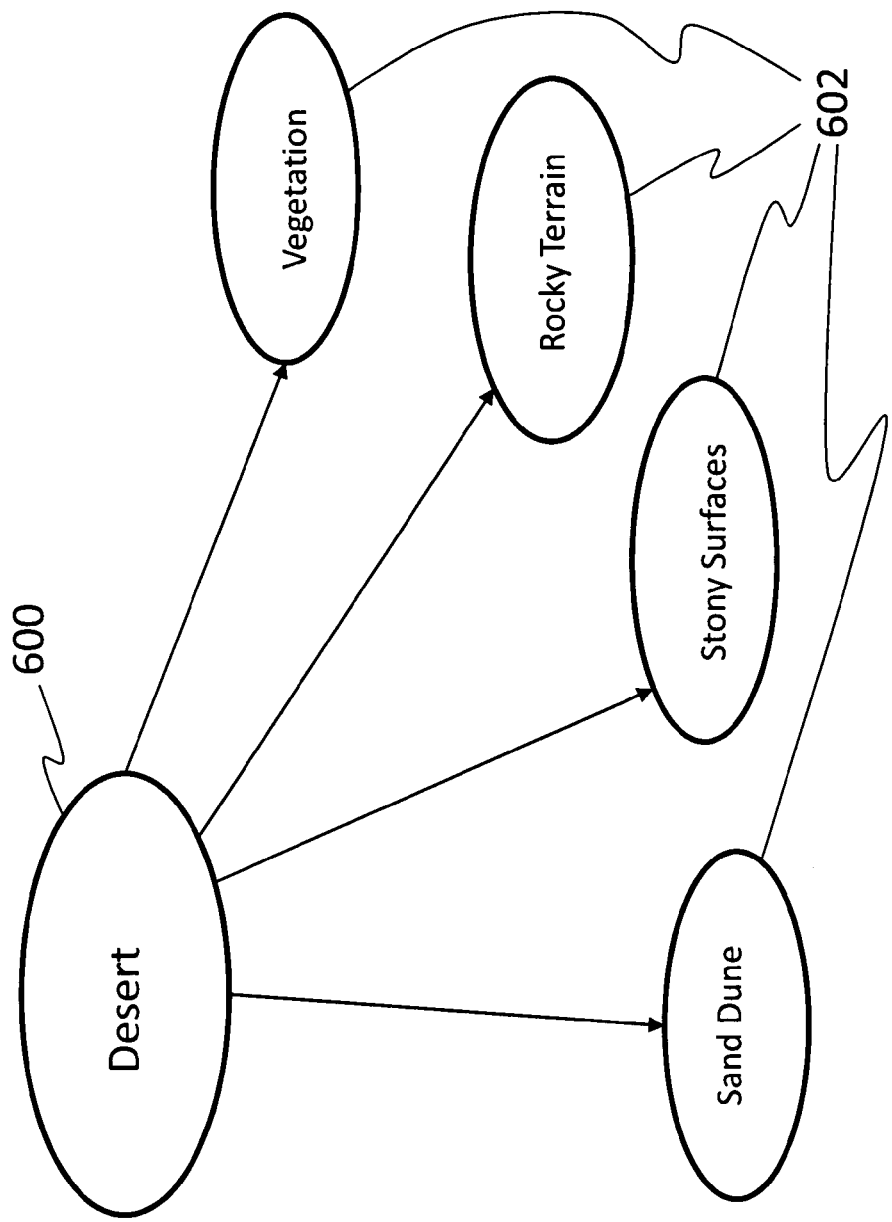
FIG. 6 is a diagram showing a Bayesian network model for a desert.

The domain knowledge database 204 is the repository of rules, models, and plans describing domain objects. More specifically, the domain knowledge database contains three main knowledge types: domain concepts defining what an entity is and tasks associated with that entity, and such information can be arranged in a Bayesian network; feature/attention models of observable relevant features that the bottom-up attention engine will select to search the imagery; and classifiers which the visual search engine will use to search the imagery and assign confidence values to observed objects. Although the domain knowledge database is presented as a single component in the present application, it can be configured as three separate domain knowledge databases. With regard to domain concepts, an airport usually consists of a control tower, landing strips, aircraft maintenance and refilling facilities, building for passengers and cargo, etc. FIG. 5 shows a Bayesian network fragment for an airport 500. The airport 500 will be stored as an object with all its constituents 502 and the relations among constituents. When analysts search for "an airport in the desert", the plan generation module 400 will query the domain knowledge database 204 to retrieve models, rules, or plans for the airport object and desert object stored in the domain knowledge base 204. FIG. 6 shows a Bayesian network fragment for a desert 600, along with its associated constituents 602.

(3.2.2) Plan Generation Module 400

Referring again to FIG. 4, the plan generation module 400 receives a query/search goal 201 as input from an operator 101 and pre-processes it into appropriate sub-queries 401. For example, the query "an airport in the desert" will become sub-queries "What consists an airport?" and "What is a desert?" These sub-queries 401 will then be issued to the domain knowledge base 204. The results may be iteratively refined to retrieve other relevant knowledge database objects. The plan generation module 400 then generates a plan of tasks/observables 203 based on the retrieved objects. The tasks/observables 203 will become the input to the top-town task execution engine 402.

(3.2.3) Top-Down Task-Execution Engine

Figure 7:
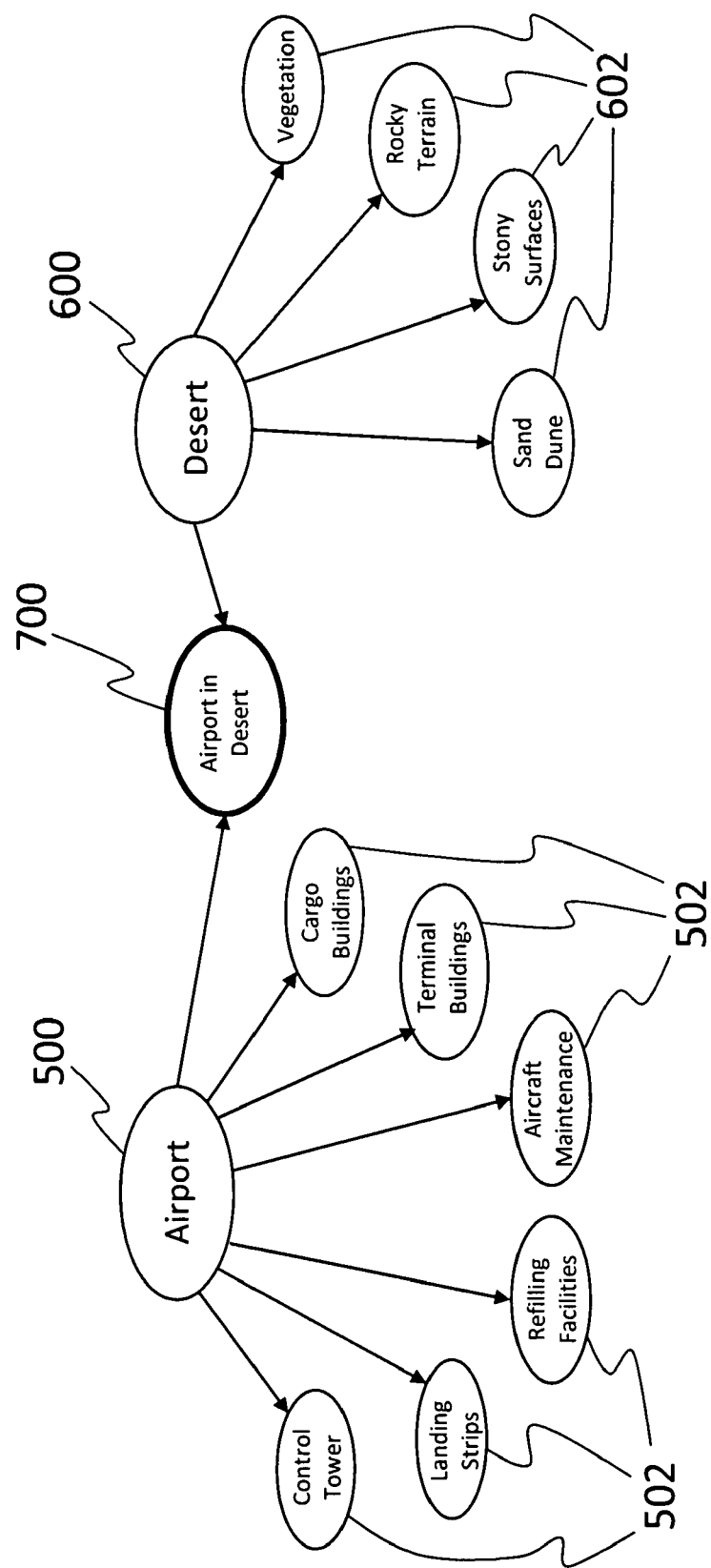
FIG. 7 is a diagram showing a combined Bayesian network model for an airport and a desert.

The top-down task-execution engine 402 takes the tasks/observables 203 as input to construct a combined Bayesian network model. Bayesian networks integrate graphical models and probability theory to efficiently represent and reason about joint probability distributions. Bayesian network models are commonly used in decision making, reasoning under uncertainty, and domain/data modeling. FIG. 7 shows a combined Bayesian network model for an airport 500 and a desert 600. The result of combining the airport 500 and desert 600 models results in a combined model representing the joint probabilities for finding an airport in a desert 700.

Referring to both FIG. 4 and FIG. 7, the top-down task execution engine 402 reasons upon the combined model 700 to generate a ranked list 406 of tasks/observables and validation scores to be sent to the visual recognition engine of the bottom-up module 202. The validation score is a measure of the utility of the observation and its confidence value to completing the task in the plan. The validation score is used to adjust the relevance of classifiers and feature attributes for determining if a specific observable is in the scene. In addition, a human analyst can also provide validation scores through the relevance feedback module. FIG. 8A is an example of a ranked list of observables 406 output from the task execution engine, with a diagnostic value 802 corresponding to each observable 406. The visual recognition engine will provide recognized features with confidence levels for the task-execution engine. The task-execution engine then instantiates this evidence into the combined Bayesian model and performs inferences to decide if the desired objects are found. FIG. 8B is a chart showing the probability of detection 804 of the search targets 806 prescribed in the search goal of locating an airport in a desert. The targets are ranked according to probability of detection. If the search targets are found, the results will then be presented back to the operator; otherwise, the task execution engine will update which features should be observed next and iterate this process with the bottom-up module until the desired search goal is reached.

(3.2.4) Relevance Feedback Module 404

Referring again to FIG. 4, the relevance feedback module 404 presents results to the operator 101 to improve future performance. The module 404 learns by updating 408 the operator's critiques into the domain knowledge base 204. Offline learning can also be performed by iterating through the process of planning and task execution so that the feature/attention model domain knowledge base can be trained.

There are significant performance benefits in using the core technologies of the system of the present invention. The previously described Bayesian reasoning system has been tested on very large knowledge schemas with over 25,000 parameters with very high specificity. The bottom-up attention models can be customized for a wide variety of objects and terrain types. The Swarm Vision framework has been extensively tested on both visible and infrared imagery from stationary as well as moving platforms with up to 15 pixels on target using classifiers that have close to a 95% detection rate at a 0.1% false alarm rate.

(4) Data Processing System

Figure 9:
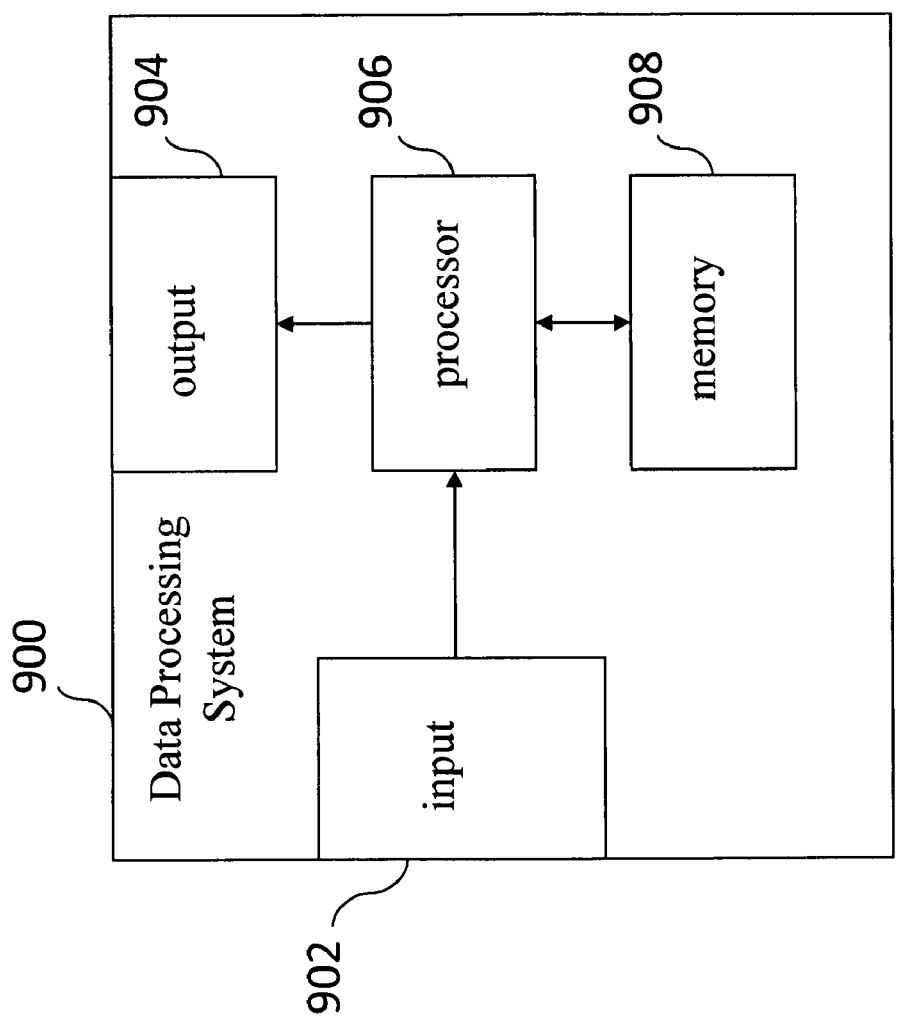
FIG. 9 is a block diagram showing a data processing system for use with the present invention.

A block diagram depicting the components of an image analysis data processing system for the present invention is provided in FIG. 9. The data processing system 900 comprises an input 902 for receiving information from at least one input data source or from an operator. Note that the input 902 may include multiple "ports." Typically, input is received from at least one imaging device, from a stored image, from a training set, or from an operator. An output 904 is connected with the processor for providing information regarding the presence and/or identity of object(s) in the input signal to an operator, either for further processing by the operator, or to display final results. The output 904 is generally presented as ranked set of candidate entities as defined in the search goal, either listed graphically, or outlined in the input image. Output may also be provided to other devices or other programs; e.g., to other software modules, for use therein. The input 902 and the output 904 are both coupled with one or more processors 906, the processor containing appropriate architecture to perform the acts of the method of the present invention, including, but not limited receiving a search goal, generating a plan of action, partitioning the plan into tasks/observables, selecting a feature/attention model for the tasks/observables, searching imagery for the tasks/observables, and outputting results as a set of candidate entities. The processor 906 is coupled with a memory 908 to permit storage of data such as image memory strings and software that are to be manipulated by commands to the processor 906.

(5) Computer Program Product

Figure 10:
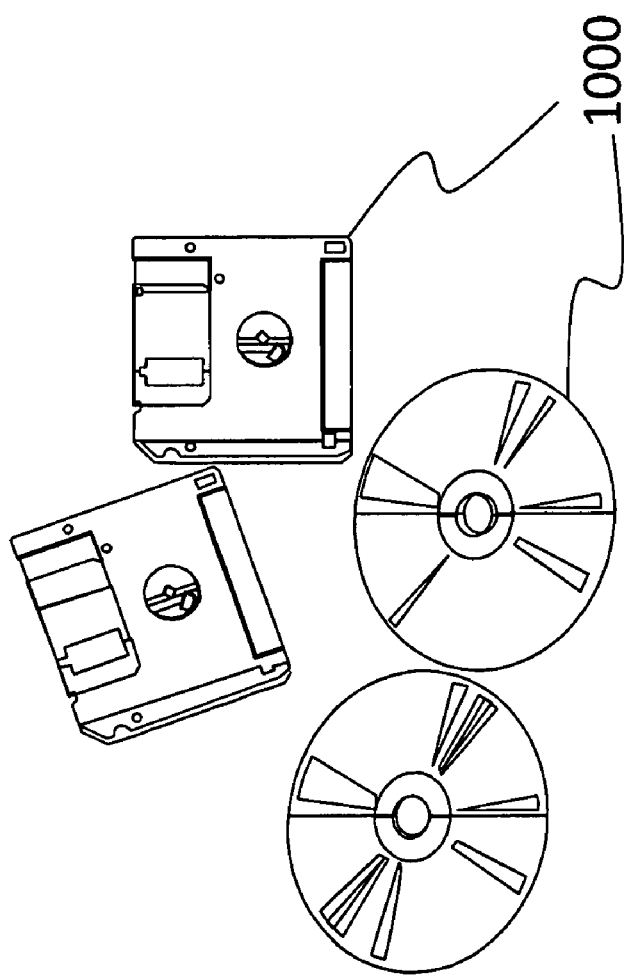
FIG. 10 is an illustration showing computer program products for use with the present invention.

An illustrative diagram of a computer program product embodying the present invention is depicted in FIG. 10. The computer program product 1000 is depicted as an optical disk such as a CD or DVD, but the computer program product generally represents any platform containing comprising computer-readable instruction means stored on a computer-readable medium that are executable by a computer having a processor for causing the processor to perform operations of the method of the present invention, as previously described. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

What is claimed is:

1. A system for directed area search in visual imagery, comprising:
   a domain knowledge database configured to store Bayesian network models comprising visual features and observables associated with various sets of entities, where the observables are associated with feature/attention models for locating the observables in visual imagery;
   a top-down module configured to:
      receive a search goal comprising a set of entities to be located in an image;
      generate a plan of action for locating the set of entities by combining the Bayesian network models relating to the set of entities to be located according to joint probability distributions to yield a combined Bayesian network model, the combined Bayesian network model describing visual features associated with the set of entities, where the Bayesian network models and associated visual features are obtained from the domain knowledge database; and
      partition the plan into a set of tasks, each task comprising at least one observable to be located in the visual imagery; and
   a bottom-up module configured to:
      select a relevant feature/attention model for each observable from the domain knowledge database;
      search the visual imagery for the at least one observable using the selected feature/attention model; and
      output search results as a set of candidate entities.

2. The system of claim 1, further comprising a user interface configured to present the set of candidate entities to an operator for validation of the set of entities.

3. The system of claim 2, wherein the top-down module is further configured to receive feedback from the operator via the user interface regarding the search results and to update the domain knowledge database based on the feedback from the operator.

4. The system of claim 3, further configured to generate a new plan of action using the updated domain knowledge database, and to iteratively repeat the search until the search goal is accomplished.

5. The system of claim 4, wherein the bottom-up module is further configured to send a report of the search results to the top-down module, the top-down module is further configured to assign a validation score to the search results based on performance accuracy of the bottom-up module in executing the set of tasks, and the validation score is then used to refine the classifier and feature/attention model used for that particular task.

6. The system of claim 5, further configured to iteratively repeat the search using the refined feature/attention model until the search goal is accomplished.

7. The system of claim 6, wherein in a case where the domain knowledge database contains no feature/attention models relating to the search goal, the search is performed using unbiased, center-surround type saliency algorithms.

8. The system of claim 7, wherein the bottom up module is configured to search the visual imagery using a cognitive swarm.

9. The system of claim 1, wherein the bottom-up module is further configured to send a report of the search results to the top-down module, the top-down module is further configured to assign a validation score to the search results based on performance accuracy of the bottom-up module in executing the set of tasks, and the validation score is then used to refine the feature/attention model used for that particular task.

10. The system of claim 9, further configured to iteratively repeat the search using the refined feature/attention model until the search goal is accomplished.

11. The method of claim 1, wherein in a case where the domain knowledge database contains no feature/attention models relating to the search goal, the search is performed using unbiased center surround type saliency algorithms.

12. A method for directed area search in visual imagery comprising acts of:
   receiving a search goal comprising a set of entities to be located in an image;
   generating a plan of action for locating the set of entities by combining Bayesian network models relating to the set of entities to be located according to joint probability distributions to yield a combined Bayesian network model, the combined Bayesian network model describing visual features associated with the set of entities, where the Bayesian network models and associated visual features are obtained from the domain knowledge database; and
   partitioning the plan into a set of tasks, each task comprising at least one observable to be located in the visual imagery;
   selecting a relevant feature/attention model for each observable from the domain knowledge database;
   searching the visual imagery for the at least one observable using the selected feature/attention model; and
   outputting search results as a set of candidate entities.

13. The method of claim 12, further comprising an act of presenting the set of candidate entities to an operator for validation of the set of entities.

14. The method of claim 13, further comprising an act of receiving feedback from the operator regarding the search results and updating the domain knowledge database based on the feedback from the operator.

15. The method of claim 14, further comprising an act of generating a new plan of action using the updated domain knowledge database, and iteratively repeating the search until the search goal is accomplished.

16. The method of claim 15, further comprising an act of assigning a validation score to the search results based on accuracy of the results of the executed set of tasks, and then using the validation score to refine the feature/attention models used for that particular set of tasks.

17. The method of claim 16, further comprising an act of iteratively repeating the search using the refined classifier and feature/attention model until the search goal is accomplished.

18. The method of claim 17, wherein in a case where the domain knowledge database contains no feature/attention models relating to the search goal, the act of searching is performed using unbiased, center-surround type saliency algorithms.

19. The method of claim 18, wherein in the act of searching the visual imagery, the search is done using a cognitive swarm.

20. The method of claim 12, further comprising an act of assigning a validation score to the search results based on accuracy of the results of the executed set of tasks, and then using the validation score to refine the classifier and feature/attention models used for that particular set of tasks.

21. The method of claim 20, further comprising an act of iteratively repeating the search using the refined classifier and feature/attention model until the search goal is accomplished.

22. The method of claim 12, wherein in a case where the domain knowledge database contains no feature/attention models relating to the search goal, the act of searching is performed using unbiased center surround type saliency algorithms.

23. A computer program product for directed area search in visual imagery, the computer program product comprising computer-readable instruction means stored on a non-transitory computer-readable medium that are executable by a computer having a processor for causing the processor to perform operations of:
receiving a search goal comprising a set of entities to be located in an image;
generating a plan of action for locating the set of entities by combining Bayesian network models relating to the set of entities to be located according to joint probability distributions to yield a combined Bayesian network model, the combined Bayesian network model describing visual features associated with the set of entities, where the Bayesian network models and associated visual features are obtained from the domain knowledge database; and
partitioning the plan into a set of tasks, each task comprising at least one observable to be located in the visual imagery;
selecting a relevant feature/attention model for each observable from the domain knowledge database;
searching the visual imagery for the at least one observable using the selected feature/attention model; and
outputting search results as a set of candidate entities.

24. The computer program product of claim 23, further comprising computer-readable instruction means for presenting the set of candidate entities to an operator for validation of the set of entities.

25. The computer program product of claim 24, further comprising computer-readable instruction means for receiving feedback from the operator regarding the search results and updating the domain knowledge database based on the feedback from the operator.

26. The computer program product of claim 25, further comprising computer-readable instruction means for generating a pew plan of action using the updated domain knowledge database, and iteratively repeating the search until the search goal is accomplished.

27. The computer program product of claim 26, further comprising computer-readable instruction means for assigning a validation score to the search results based on accuracy of the results of the executed set of tasks, and then using the validation score to refine the classifier and feature/attention models used for that particular set of tasks.

28. The computer program product of claim 27, further comprising computer-readable instruction means for iteratively repeating the search using the refined classifier and feature/attention model until the search goal is accomplished.

29. The computer program product of claim 28, wherein in a case where the domain knowledge database contains no feature/attention models relating to the search goal, searching is performed using unbiased, center-surround type saliency algorithms.

30. The computer program product of claim 29, further comprising computer-readable instruction means to search the visual imagery using a cognitive swarm.

31. The computer program product of claim 23, further comprising computer-readable instruction means for assigning a validation score to the search results based on accuracy of the results of the executed set of tasks, and then using the validation score to refine the classifier and feature/attention models used for that particular set of tasks.

32. The computer program product of claim 31, further comprising computer-readable instruction means for iteratively repeating the search using the refined classifier and feature/attention model until the search goal is accomplished.

33. The computer program product of claim 23, wherein in a case where the domain knowledge database contains no feature/attention models relating to the search goal, searching is performed using unbiased center surround type saliency algorithms.

* * * * *